W. B. STEVENSON.
Attaching T Squares to Drawing-Boards.

No. 165,888.

Patented July 20, 1875.

Witnesses:
L. F. Brous,
A. P. Grant.

Inventor:
Wm. B. Stevenson
by John A. Wiedersheim
Atty.

UNITED STATES PATENT OFFICE.

WILLIAM B. STEVENSON, OF PHILADELPHIA, PENNSYLVANIA.

IMPROVEMENT IN ATTACHING T-SQUARES TO DRAWING-BOARDS.

Specification forming part of Letters Patent No. 165,888, dated July 20, 1875; application filed November 28, 1874.

*To all whom it may concern:*

Be it known that I, WILLIAM B. STEVENSON, of the city and county of Philadelphia and State of Pennsylvania, have invented a new and useful Improvement in Drawing-Boards, T-Squares, Rules, &c.; and I do hereby declare the following to be a clear and exact description of the nature thereof, sufficient to enable others skilled in the art to which my invention appertains to fully understand, make, and use the same, reference being had to the accompanying drawings, making part of this specification, in which—

Figure 1:
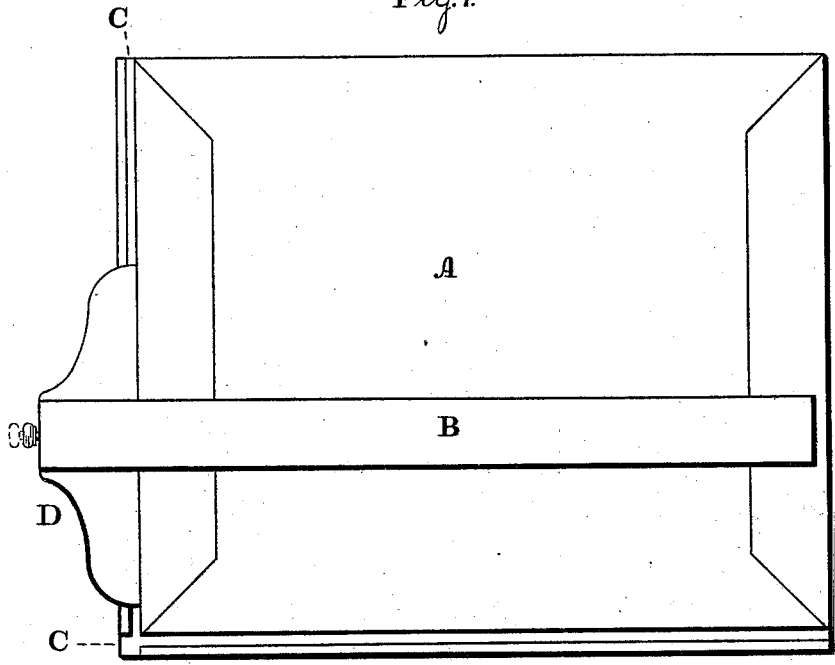
Figure 2:
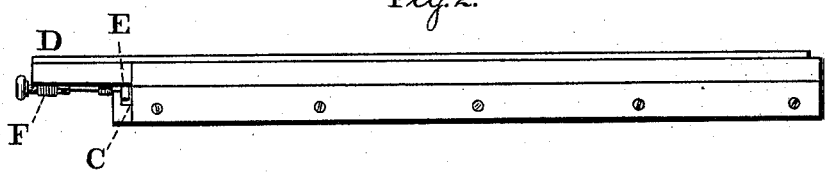
Figure 3:
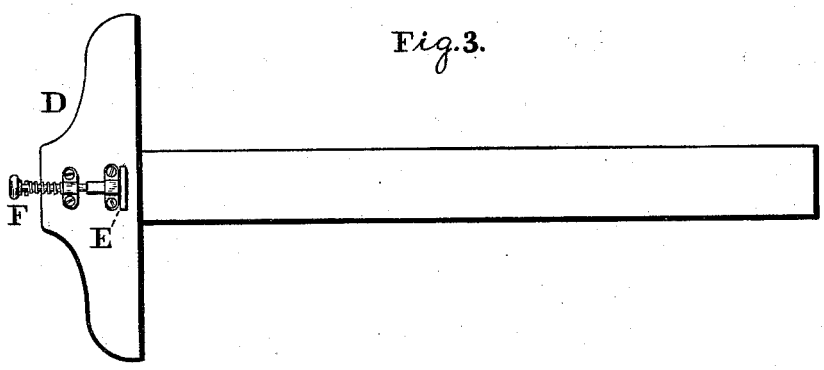

Figure 1 is a face view of the device embodying my invention. Fig. 2 is a side view thereof. Fig. 3 is a view of the under side of the square, rule, or similar implement.

Similar letters of reference indicate corresponding parts in the several figures.

My invention consists in providing a drawing-board with a way in one or all of its sides, and the head of a square, rule, or other implement with a spring-pressed plate, which shall enter the way in the board, and hold the implement steady and firm in position on the board, and without interfering with the adjustment-movements of the implement.

Referring to the drawings, A represents a drawing-board, and B a T-square, both of which generally are of usual construction. C represents a way, which is formed in one or all of the sides of the board A, either by deeply grooving said sides and cutting away the upper portion of the outer wall of the groove, or by fitting low down strips to the board, and leaving spaces between the strips and board. Other modes of forming the way may be adopted. On the under side of the head D of the square B there is fitted a longitudinal sliding plate, E, which extends transversely and is controlled by a spring, F, so that the said plate will be pressed in a direction opposite to the inner line or edge *a* of the head.

In operation the plate E is pressed inwardly, and the square applied to the drawing-board so that said plate will enter the way C, the head of the square resting above the way, and the line *a* bearing against the side of the board, as usual in such cases. On letting go of the knob or button of the plate E the action of the spring F causes the head to pass firmly and steady against the board, and thus hold the same, whereby displacement of the square or implement is prevented, and accuracy and ease of work are accomplished. The lateral adjustment of the implement is in no wise prevented, it only being necessary to employ a force a little greater than the power of the spring, and thus slide the implement to the desired spot, the plate remaining in the way C without liability to displacement.

In order to remove the implement from the board it is merely lifted therefrom, the plate in no wise preventing the same.

Having thus described my invention, what I claim as new, and desire to secure by Letters Patent, is—

1. The implement B, having the spring-plate E, substantially as and for the purpose set forth.

2. The implement B, having the spring-plate E, combined with the drawing-board formed with the way or ways C, substantially as and for the purpose set forth.

WM. B. STEVENSON.

Witnesses:
JOHN A. WIEDERSHEIM,
JNO. A. BELL.